April 4, 1950          W. R. SMITH          2,502,676

RELEASE MECHANISM FOR INJECTION MACHINES

Filed Nov. 7, 1947          4 Sheets-Sheet 1

INVENTOR.
WILLIAM R. SMITH
BY
ATTORNEY

April 4, 1950        W. R. SMITH        2,502,676

RELEASE MECHANISM FOR INJECTION MACHINES

Filed Nov. 7, 1947        4 Sheets-Sheet 3

*INVENTOR.*
WILLIAM R. SMITH
BY
ATTORNEY

April 4, 1950 W. R. SMITH 2,502,676
RELEASE MECHANISM FOR INJECTION MACHINES
Filed Nov. 7, 1947 4 Sheets-Sheet 4

INVENTOR.
WILLIAM R. SMITH
BY
ATTORNEY

Patented Apr. 4, 1950

2,502,676

UNITED STATES PATENT OFFICE 2,502,676

RELEASE MECHANISM FOR INJECTION MACHINES

William Ralph Smith, Kalamazoo, Mich., assignor to The Upjohn Company, Kalamazoo, Mich., a corporation of Michigan Application November 7, 1947, Serial No. 784,711

11 Claims. (Cl. 128—215)

This invention relates in general to an injection machine and more particularly to a type thereof having an adjustable, resettable, automatic release mechanism.

Injection machines are known to exist by means of which a plurality of syringes may be actuated simultaneously and stopped simultaneously by automatic means. Such a multiple injection machine is disclosed in the co-pending application of Leonard T. Cookson, Serial Number 594,976, now Patent No. 2,489,966.

Although it is possible to interrupt the actuation of a single syringe in the above mentioned multiple injection machines, it is difficult to reset accurately the individual, interrupted syringe for completion of its operation. Furthermore, present multiple injection machines have no means by which individual syringes may be automatically interrupted or stopped while the actuation of the remaining syringes continues.

Accordingly, a primary object of this invention is the provision of an adjustable release mechanism for an injection machine.

A further objection of this invention is the provision of an adjustable release mechanism for a multiple injection machine whereby the actuation of individual syringes may be easily interrupted either manually or automatically, independent of the remaining syringes held in said injection machine.

A further object of this invention is the provision of an adjustable release mechanism for a multiple injection machine as aforesaid whereby the actuation of each syringe may be automatically terminated at a different, predetermined and preset time.

A further object of this invention is the provision of an adjustable release mechanism for a multiple injection machine as aforesaid which may be reset easily so that the actuation of an individual syringe may be resumed, independently of other syringes operated by the machine, and carried to completion regardless of the termination of the actuation of said other syringes.

Other objects and purposes of this invention will become apparent to persons familiar with this type of equipment upon referring to the accompanying drawings and upon reading the following specification.

In order to meet the heretofore mentioned objects and purposes, as well as others incidental thereto and associated therewith, I have provided a multiple injection machine in which a plurality of gear racks are pivotally mounted and slidably supported so that they may be reciprocated in a horizontal direction and so that they will be engaged in pairs by suitable gear pinions mounted on a suitably supported, horizontal jack shaft. Means, in the form of a centrally pivoted locking bar, is provided whereby each rack is independently held in engagement with its corresponding gear pinion. Resilient means effects a disengagement between each rack and pinion when the locking bar associated with any given gear rack is pivoted away from its holding position. A tripping bolt, adjustably and horizontally mounted with respect to each gear rack, moves with said rack and is positioned so as to engage said locking bar and pivot it away from that position in which it holds said rack in engagement with said pinion, when and as desired.

For one, but not the only, preferred embodiment of this invention, attention is directed to the drawings in which.

Construction

Figure 1:
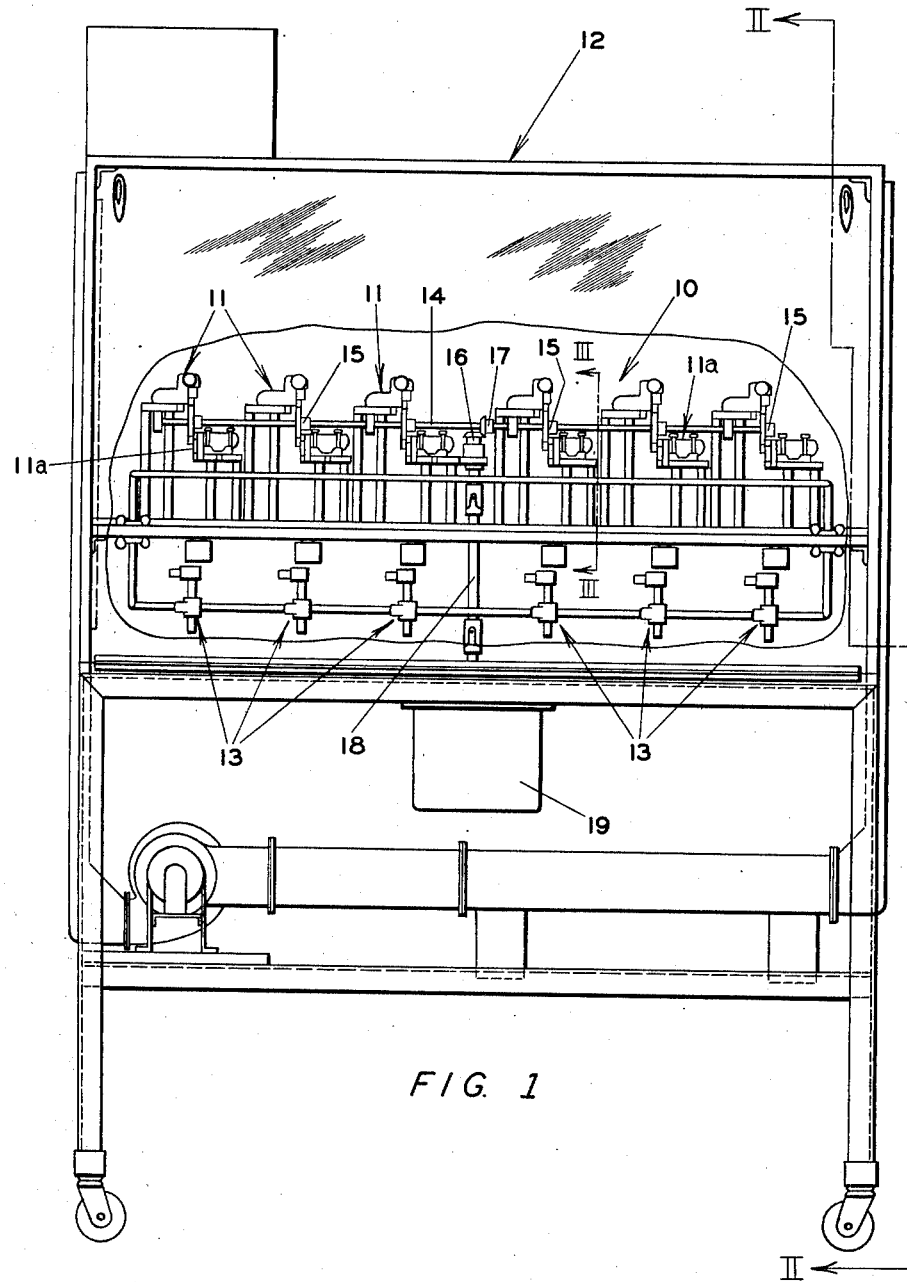
Figure 1 is a front elevational view of an injection machine including a plurality of the syringe actuation and release mechanisms to which this invention relates.
Figure 2:
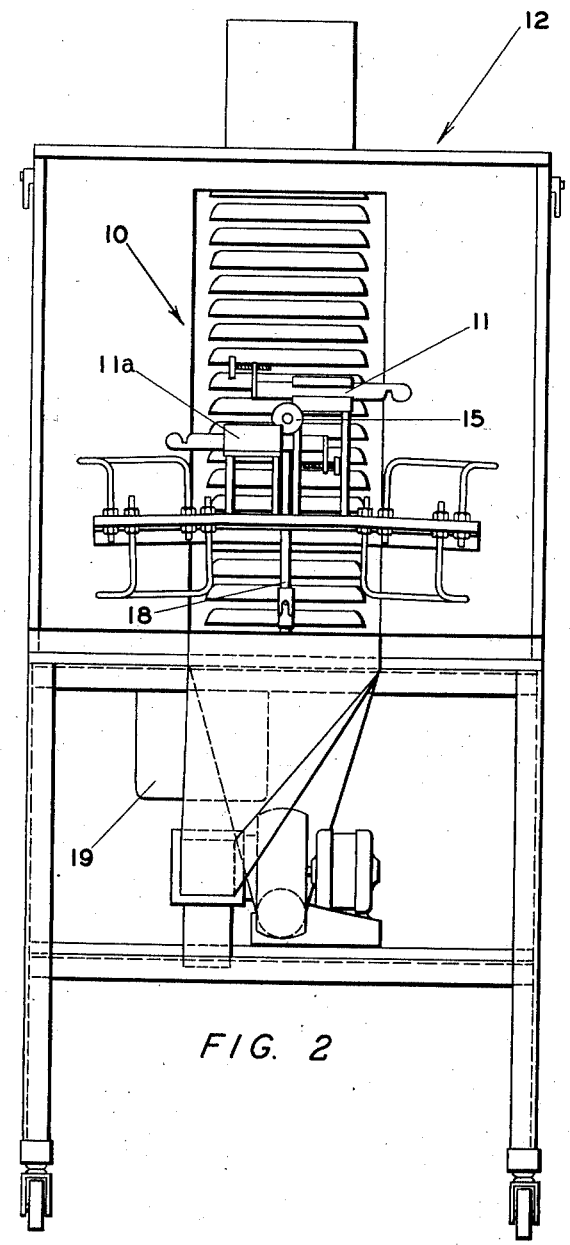
Figure 2 is a cross sectional view of the said injection machine taken along the line II—II in Figure 1.

As illustrated in Figures 1 and 2, the multiple injection machine 10, which is comprised of a plurality of independent upper and lower actuation and release mechanisms 11 and 11a, respectively, may be housed within and/or supported upon any convenient conventional cabinet 12. In this embodiment said cabinet 12 is, for illustrative purposes only, supported upon wheeled means, is provided with an air conditioning system, and has transparent side panels.

The said injection machine 10 in this particular case is designed to hold a plurality of rats and inject them with fluids from syringes, is equipped with counting units 13 of a well known type and has suitable supports therefor.

A horizontal jackshaft 14, which supports a plurality of gear pinions 15 at intervals throughout its length, is driven through the bevel gears 16 and 17 and the drive shaft 18 by the gear box 19. Said gear box 19 contains a gear train, which may be substantially as disclosed in the said co-pending application Serial Number 594,976, and which provides suitable control of the rotational speed of said jackshaft 14 and the said attached pinions.

Each pair of one upper and one lower actuation and release mechanisms cooperating with a single pinion may be mounted upon appropriate, adjacent platforms 22 and 23 respectively (Figures 3 and 4), so that the gear rack 24 of the upper release mechanism 11 operates on top of the pinion 15 while the gear rack 25 of the lower release mechanism 11a operates on the underside of the same pinion 15.

*The upper actuation and release mechanism*

Since the several injection groups indicated at 11 in Figure 1 are all identical with each other, complete disclosure of my machine may be made by describing a single group which may be any group of the whole assembly. For convenience, primary attention in making such disclosure will be given to the upper member of each group, although the lower will be mentioned where necessary for completeness.

As shown in Figures 3, 4, 5, and 6, the upper actuation and release mechanism 11 has a rectangularly shaped guide support block 26, which is secured in a vertical position to one edge of the platform 22 by stud bolts or other suitable means. Said support block and platform may be fabricated from bar or plate material such as steel of suitable thickness and strength.

A top guide member 27, which is comprised of a top retaining plate 28 and top retaining plate shim 29, is secured as by bolting to the face 30 of the guide support block 26 adjacent to the upper horizontal edge thereof. A bottom guide member 32, which is comprised of a bottom retaining plate 33 and bottom retaining plate shim 34, is secured as by bolting to the face 30 of the guide support block 26 adjacent to the lower horizontal edge thereof. Said retaining plates and retaining plate shims are preferably made from steel.

Figure 5:
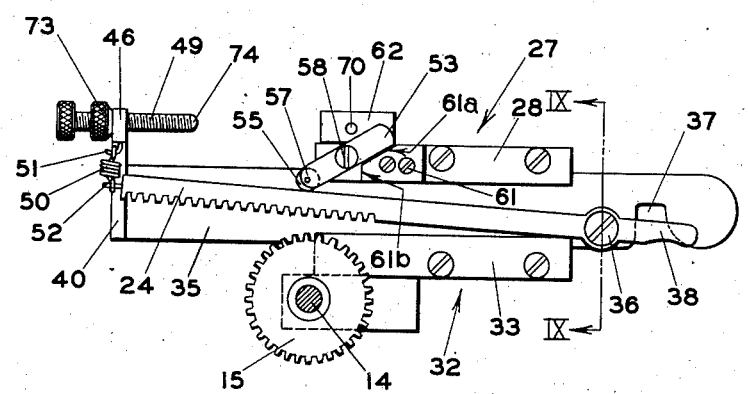
Figure 5 is a side view of an individual actuation and release mechanism.
Figure 6:
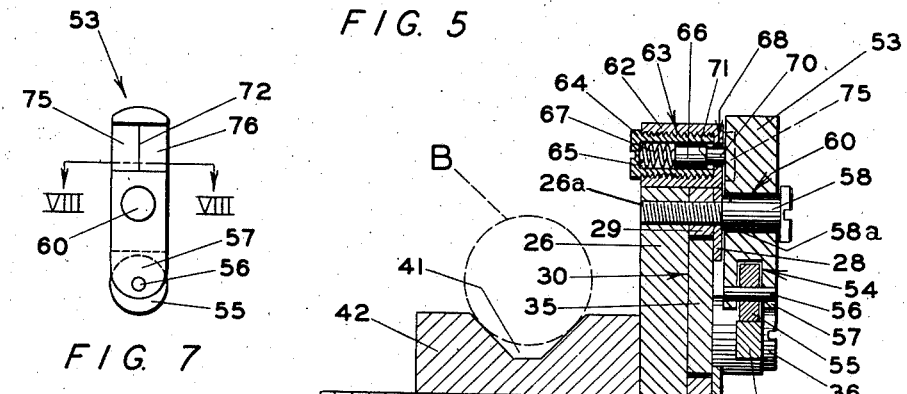
Figure 6 is a cross-sectional view of an actuation and release mechanism taken along the line VI—VI in Figure 3.

An upper rack support arm 35, which may be made from steel bar, is slidably held between the retaining plate shims 29 and 34 and against the face 30 of the support block 26 by the retaining plates 28 and 33, substantially as shown in Figures 5 and 6.

Figure 3:
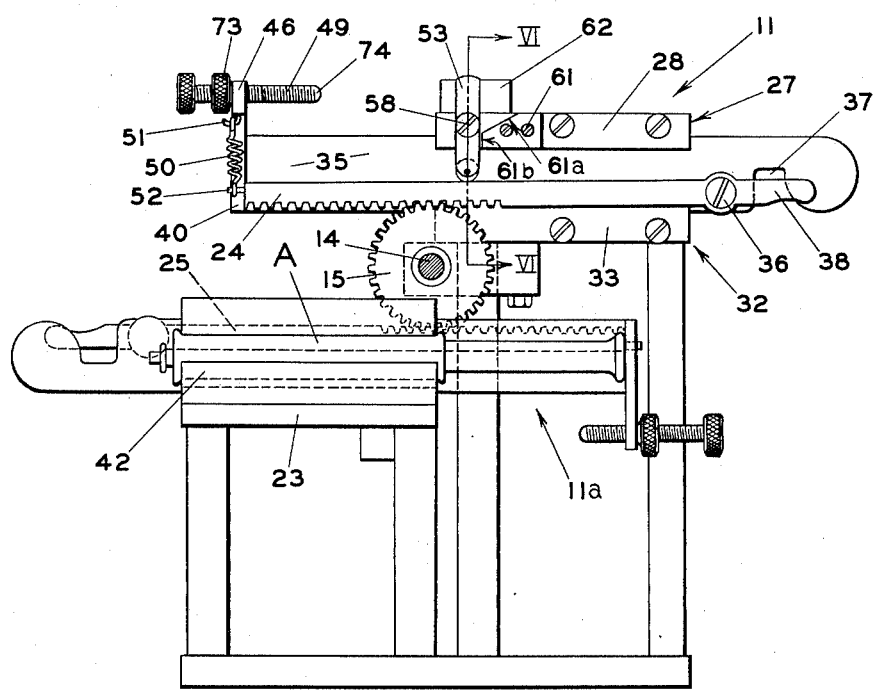
Figure 3 is a side view of a pair of cooperating actuation and release mechanisms taken on any section between pairs thereof, such as the section III—III of Figure 1.
Figure 10:
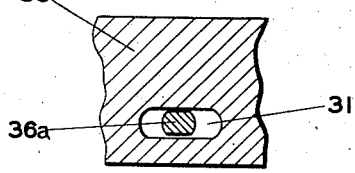
Figure 10 is a cross-sectional fragmentary view of Figure 9 taken along the line X—X.
Figure 9:
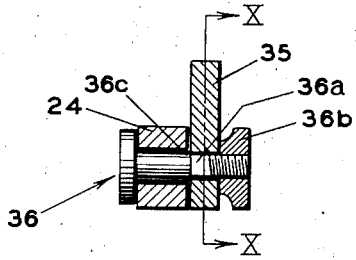
Figure 9 is a cross-sectional view of Figure 5 taken along the line IX—IX.

The upper gear rack 24 is pivotally secured by suitable means, such as the pivot bolt 36, near one of its extremities to the said support arm 35 at a point near one end thereof, so that the nearest ends of both the said gear rack and support arm extend slightly beyond said pivot bolt 36 as illustrated in Figures 3 and 5. The bolt 36, which pivotally supports the rack 24, has a flattened portion 36a (Figures 9 and 10) slidably received through an elongated slot 31 in said support arm 35, the unflattened portion forming a shoulder 36c limiting the extent to which said bolt will pass through the support arm 35, and being of length slightly greater than the thickness of the gear rack 24.

A nut 36b engages the threaded end of said bolt 36 which extends beyond said arm 35, said threaded end being either flattened similarly to the portion 36a or being of sufficiently reduced diameter to pass through said slot 31. By loosening said nut 36b, said rack 24 may be adjusted longitudinally with respect to said support arm 35 after which said nut is, of course, tightened to hold said parts in adjusted position. The holding pressure being between said nut and said shoulder 36c, when said nut is tightened against said support arm, the gear rack 24 will be free to pivot on said bolt 36. A notch 37 in the extended short end of said support arm 35 provides space into which an operator's finger may conveniently enter when grasping said support arm for the purpose of lateral adjustment or when pivoting said gear rack 24 by manually engaging its extended short end 38.

The upper gear rack 24 is disposed directly above and in alignment with the pinion 15 and is provided with teeth on its lower side, which teeth cooperate with said pinion 15.

Figure 4:
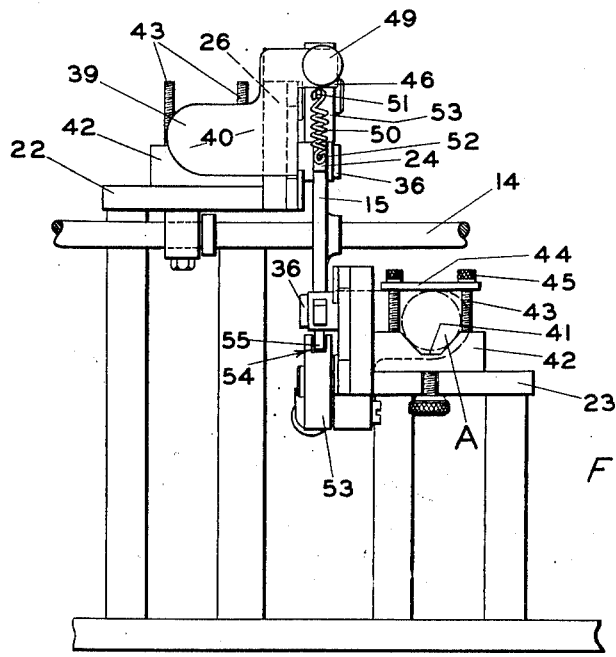
Figure 4 is an end view of said pair of actuation and release mechanisms.

That end of said upper rack support arm 35 remote from the pivot bolt 36 is perpendicularly secured, as by bolting or brazing, to a syringe engaging plate 40, which plate extends sidewardly on one side of said support arm to provide a flange 39 which engages the plungers of syringes A or B held within the longitudinal grooves 41 in either of the upper or lower syringe support blocks 42, as shown in Figures 3, 4 and 6.

The upper syringe support block 42, which is rectangular in shape and may be fabricated from any suitable material such as steel, is mounted upon the upper platform 22 adjacent to and parallel with the guide support block 26, as shown in Figures 4 and 6. A plurality of threaded studs 43, are provided with crosspieces 44 and nuts 45 whereby the syringe A in Figures 3 and 4, or the syringe B in Figure 6 may be held fixedly with respect to the non-movable parts of the actuation and release mechanisms 11 and 11a.

The syringe engaging plate 40 protrudes on the other side of said rack support arm to provide a flange 46 which contains a threaded opening for cooperation with an adjustable tripping bolt 49 whose construction and function will be described in detail hereinafter.

A resilient means, such as the spring 50, is secured at its upper extremity to an upper pin 51, which pin is affixed to the said flange 46 in any suitable manner such as by brazing. The lower end of said spring 50 is secured to a lower pin 52 which pin extends longitudinally from that extremity of said gear rack 24 adjacent to the syringe engaging plate 40. The spring 50 tends to disengage the teeth of the rack 24 from the pinion 15, as shown in Figure 5.

A locking bar 53 (Figures 5, 6 and 7), which is preferably fabricated of a long square bar, has a slot 54 at one end to receive a roller 55 which is rotatably supported upon a shaft 56, said shaft being so mounted in the fork 57, provided by said slot 54, that said roller will extend slightly beyond the adjacent extremities of the fork 57. The locking bar 53 is pivotally supported upon a pivot bolt 58 which bolt is slidably received through an appropriate opening 60 in said locking bar 53 about midway between the extremities thereof.

The said pivot bolt 58 is supported by and threadedly received into a suitable opening 26a through the top guide member 27 and the guide support block 26 with a shoulder 58a limiting the extent of entry into said opening, so that said locking bar 53 is held snugly but freely and pivotally against said retaining plate 28.

A locking bar stop block 61, which is secured, as by bolting, to the top guide member 27 adjacent to the locking bar 53, limits the pivotal movement of said locking bar in one direction (clockwise in Figure 5) by its edge 61a to a position inclined about 60 degrees to the vertical, and in the other direction (counter clockwise in Figure 3), by its edge 61b, to a substantially vertical position.

A pawl block 62 is secured in any suitable manner, such as by bolting, to the upper edge of the guide support block 26 and top guide member 27, and is positioned thereon adjacent to the locking bar 53 when said locking bar is in the vertical position. One face of said pawl block 62 is in substantially the same plane as the outer face of the top retaining plate 28.

The pawl block 62, which is preferably but not necessarily fabricated from steel, is provided with a threaded recess 63 into which a suitably threaded pawl guide plug 64 is received. Said pawl guide plug has a co-axial, cylindrical pawl chamber 65 which opens out of the inner end of said pawl guide plug 64. Said pawl chamber 65 slidably receives a pawl 66 and houses a spring 67 which is held under compression between the closed end of the pawl chamber 65 and the head of the pawl 66. The face of the pawl block 62, adjacent to said locking bar 53, contains a circular opening 68 which is concentric with the pawl chamber 65, but of less diameter.

The pawl 66 has a tip 70 which, being slidably received within the opening 68, is of less diameter than the remainder of the said pawl and thereby creates a shoulder 71 on said pawl. The said shoulder 71 is engaged by the portion of the inner wall of the recess 63 surrounding said opening 68, thereby preventing the spring 67 from ejecting the pawl 66 out of the chamber 65 when the guide plug 64 is in its operating position as shown in Figure 6 but when the locking bar has moved out of pawl engaged position (Figure 5).

Figure 7:
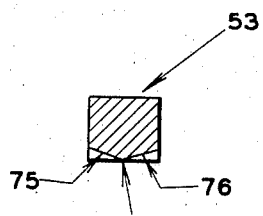
Figure 7 is a detail showing the construction of the locking bar.
Figure 8:
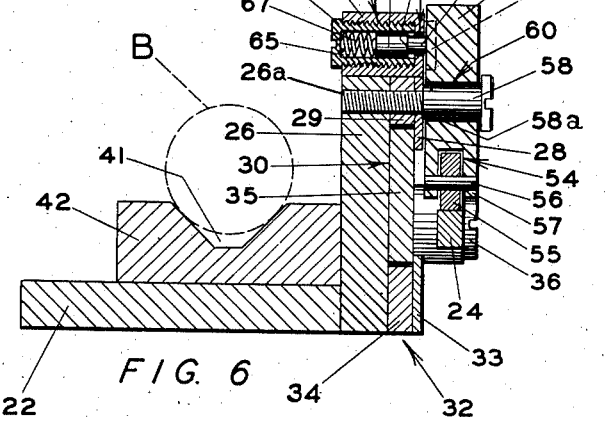
Figure 8 is a section taken on the line VIII—VIII of Figure 7.

That face of the locking bar 53 adjacent to the pawl block 62 is beveled on either side of the vertical center line of said face, as appearing in Figure 6, 7 and 8, thereby leaving a ridge 72 along said center line near that end of said locking bar remote from the roller 55. Said bevels slope away from the said ridge to the edge of the bar and are hereinafter referred to as the locking bevel 75 and the unlocking bevel 76. In order to permit the locking bar 53 to move into or out of the vertical position, the pawl 66 must be depressed into the chamber 65 by the ridge 72.

The aforementioned tripping bolt 49 may be of any suitable type and length having means, such as a lock nut 73, by which said bolt may be held in adjustably fixed relationship with respect to the flange 46 which supports it. The said bolt is so positioned that its tip 74 will engage the beveled end of said locking bar 53 when the upper rack support arm 35 moves said bolt 49 into the appropriate position.

In its vertical position, shown in Figure 3, the locking bar holds the rack against the urging of the spring 50 and in engagement with said pinion. In its tripped position, shown in Figure 5, the locking bar 53 no longer holds the upper rack 24 in engagement with the pinion 15. The upper rack 24, which is raised by the spring 50 when the bolt 49 trips the locking bar 53, bears against the roller 55, thereby moving said locking bar around until its upper end rests, as aforesaid, against the edge 61a of the locking bar stop block 61.

It will be observed in Figures 3 and 4 that the lower actuation and release mechanism 11a is substantially a duplicate of the upper actuation and release mechanism, operated in the inverted position, with certain parts being appropriately reversed and driven by the same pinion 15. Such parts, which include the syringe engaging plate 40, the lower rack 25, and the adjustment bolt 49, may be so reversed without departing from the scope of the invention, as heretofore described in connection with the upper actuation and release mechanism 11. The disclosure of this invention has been made, for convenience, with reference to the upper actuation and release mechanism but this is for convenience only and is not intended to limit the invention.

Operation

The jackshaft 14 and attached pinions 15 may be, but are not necessarily, already rotating when the syringe driving mechanism is to be adjusted. Such rotation however, as controlled by the gear box 19, is at a very slow rate, sometimes at the rate of only one revolution or less in twenty-four hours, which is so imperceptible that all adjustments incident to starting or stopping the operation at a particular syringe may be made while the mechanism is fully operative with respect to other syringes. Therefore, the first step in operating the said mechanism usually comprises the proper positioning of the tip 74 of each respective tripping bolt 49 with respect to the opposed side of each cooperating locking bar 53 so that the said bolts will engage and trip the several locking bars as desired. Next, with the syringe in place and the rack disengaged from the pinion, by appropriate movement of the rack support arm 35, the syringe engaging plate is placed in contact with the head of the syringe plunger in its starting position.

Due to the usual slow rotational speed of the pinion 15 and the necessity of interfitting the teeth of the rack and of the pinion in any rotational position of the pinion, the nut 36b is loosened and the rack 24 is adjusted longitudinally of said support arm 35 until the teeth on said rack are in proper position for engageemnt with the teeth on said pinion. The upper gear rack 24 is then pivoted down upon said pinion 15 against the tension of the spring 50 attached to the opposite end of said rack. The nut 36b is tightened and the pinion 15 begins to drive the rack 24 and through it the arm 35. The locking bar 53, which was assumed to be resting against the edge 61a of the locking bar stop block 61 up to this point, may now be manually pivoted upon the pivot bolt 58 until the vertical ridge 72 has snapped past the pawl tip 70 and said locking bar is in a vertical position resting against the edge 61b of the said locking bar stop block 61. The pawl tip 70, which thereupon engages the locking bevel 75, holds said locking bar in said vertical position against said stop block 61, thereby holding said rack 24 in operative engagement with said pinion 15.

The pinion 15 which rotates in a clockwise direction as appearing in Figures 3 and 5 effects a rightward movement of the upper rack 24, the attached upper rack support arm 35, the tripping bolt 49 and the syringe engaging plate 40 by which the said syringe plunger is driven for such purposes as are desired. After a predetermined period of time has elapsed, selected as aforesaid by adjustment of said tripping bolt, the tripping bolt tip 74 engages the upper end of the locking bar 53, urging it in a clockwise direction, as appearing in Figures 3 and 5, until the ridge 72 passes the pawl tip 70. The pressure of said pawl tip against the unlocking bevel 76 then effects a continued clockwise rotation, to its stop 61a of said locking bar, which rotation is assisted by the tension of the spring 50. As the rotation of said locking bar moves the unlocking bevel 76 beyond the pawl tip 70, the locking bar 53 is also pivoted sufficiently to permit a disengagement between the gear rack 24 and the pinion 15. Said spring 50 holds said upper rack in contact with the roller 55 which thereby continues the clockwise rotation of the locking bar until it rests against the edge 61a of the stop block 61 as far out of the vertical position as permissible.

If it becomes desirable to terminate the operation of a particular syringe before the end of the period, when it would be automatically stopped as aforesaid, the locking bar may be manually tripped and the sequence of actions from thereon will be the same as described with reference to the automatic release.

The mechanism may be reset, in the event that operation has been stopped temporarily, by effecting a re-engagement between the rack and the pinion substantially as described in connection with the original engagement.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In an actuation and release mechanism for automatically dispensing fluids from a syringe, the combination comprising: a frame and means supporting a syringe thereon; a rectangular guide support block supported on said frame; an upper horizontal guide member secured to the said guide support block adjacent to the upper edge thereof; a lower horizontal guide member secured to said guide support block adjacent to the lower edge thereof; a rack support arm, slidably held within and between said upper and lower horizontal guide members, said arm having a gripping notch and a horizontal slot near one end thereof; a horizontally adjustable rack having a pivotally associated supporting pin near one of its ends adjustably held within said horizontal slot of said rack support arm for pivotally supporting same thereon, and provided at its other end with a spring supporting pin, said rack having teeth on its lower edge; a driven gear supported on said frame; a locking bar having a slot in its lower end, and a roller rotatably supported therein, and having an integral stop at its upper end, said locking bar being pivotally supported about midway between its extremities on the said upper guide member; a locking bar stop block secured to said upper guide member adjacent to said locking bar; a pawl support block supported upon and secured to the top edge of said guide support block, adjacent to the upper portion of said locking bar and cooperable therewith and a spring loaded pawl mounted therein for holding said locking bar releasably in position either to hold said rack in engagement with said gear or in position permitting said rack to separate from said gear; a syringe engaging flange perpendicularly secured to that end of said rack support arm remote from said gripping notch; a resilient means secured at one end to said syringe engaging flange and secured at its other end to the said spring supporting pin; and an adjustment screw threadedly held by said syringe engaging flange and supported to strike said upper end of said locking bar when same is in position to effect engagement between said gear and said rack when said rack supporting bar has moved a preselected distance in response to rotation of said gear; also constructed and arranged so that when the locking bar is held in one position by said spring loaded pawl, the roller in the lower end thereof bears against the said rack, holding it in engagement with said gear until the gear has moved the rack and its attached support arm to a position where the said adjustment screw engages the upper end of said locking bar, thereby pivoting said locking bar away from said rack and against said locking bar stop block and permitting the resilient means to withdraw said rack from engagement with said gear.

2. An automatically or manually releasable syringe driving means for an injection machine comprising in combination: a frame; a guide support block mounted thereon and upper and lower guide members on said guide support block; means also mounted on said frame for detachably supporting a syringe with its axis parallel to said guide members; a rack supporting bar supported by said guide members for reciprocation on a line parallel to the axis of said syringe; a rack pivotally mounted at one of its ends to said rack supporting bar near an end thereof, the mounting also providing for adjustment of said rack on said rack supporting bar along a line also parallel to the axis of said syringe; resilient means affixed to the other end of said rack supporting bar urging said rack in a direction away from the toothed side thereof; a driven pinion supported on said frame in position for engagement by said rack in one pivotal position thereof; a locking bar pivotally supported on said guide support block, in one pivotal position holding said rack in engagement with said pinion and in another pivotal position permitting said rack to respond to said resilient means and move out of such engagement; releasable means yieldingly holding said locking bar selectively in either of said positions; an axially adjustable screw supported by said rack supporting bar in line for engagement with a portion of said locking bar when same is in said one pivotal position for holding said rack in engagement with said pinion upon syringe driving movement of said rack supporting bar a preselected distance, and upon further such movement for moving said locking bar into said other pivotal position and permitting said rack to disengage said pinion; syringe engaging means on said rack supporting bar for engaging and moving the plunger of said syringe; wherein said plunger will be moved as said rack supporting bar moves in response to rotation of said pinion until said screw strikes said locking bar and permits said rack and said pinion to disengage in response to said resilient means and stop the movement of said syringe plunger.

3. An automatically or manually releasable syringe driving means for an injection machine comprising in combination: a frame; a guide support block mounted thereon and upper and lower guide members on said guide support block; means also mounted on said frame for detachably supporting a syringe with its axis parallel to said guide members; a rack supporting bar supported by said guide members for reciprocation on a line parallel to the axis of said syringe; a rack mounted at one of its ends pivotally and adjustably along said line to said rack supporting bar near an end thereof; resilient means affixed to the other end of said rack supporting bar urging said rack in a direction away from the toothed side thereof; a driven pinion supported on said frame in position for engagement by said rack in one pivotal position thereof; a locking bar pivotally supported on said guide support block in one pivotal position holding said rack in engagement with said pinion and in another pivotal position permitting said rack to respond to said resilient means and move out of such engagement; releasable means yieldingly holding said locking bar selectively in either of said positions; axially adjustable means moving in predetermined relationship with said rack supporting bar as same moves in response to rotation of said pinion, said axially adjustable means engaging, after a preselected period of such moving, said locking bar when same is in said one pivotal position and moving it into said other pivotal position to permit said rack to move in response to said resilient means and disengage said pinion; syringe engaging means on said rack supporting bar for engaging and moving the plunger of said syringe; wherein said plunger will be moved as said rack supporting bar moves in response to rotation of said pinion until said screw strikes and moves said locking bar and thereby permits said rack and said pinion to disengage in response to said resilient means and stop the movement of said syringe plunger.

4. An automatically or manually releasable syringe driving means for an injection machine comprising in combination: a frame; a guide support block mounted thereon and upper and lower guide members on said guide support block; means also mounted on said frame for detachably supporting a syringe with its axis parallel to said guide members; a rack supporting bar supported by said guide members for reciprocation on a line parallel to the axis of said syringe; a rack mounted at one of its ends pivotally and adjustably along said line to said rack supporting bar near an end thereof; resilient means affixed to the other end of said rack supporting bar urging said rack in a direction away from the toothed side thereof; a driven pinion supported on said frame in position for engagement by said rack in one pivotal position thereof; locking means movably mounted in position fixed with respect to said frame in one position holding said rack in engagement with said pinion and in another position permitting said rack to disengage said pinion in response to urging of said resilient means; adjustable means, moving in predetermined relationship with said rack supporting bar as same moves in response to rotation of said pinion, contacting at a perdeterminable time said locking means when same is in said one position and moving it to its other position and thereby permitting said rack to disengage said pinion; a syringe engaging plate on said rack supporting bar for engaging and moving the plunger of said syringe; wherein said plunger will be moved as said rack supporting bar moves in response to rotation of said pinion until said screw strikes said locking bar and permits said rack and said pinion to disengage in response to said resilient means and stop the movement of said syringe plunger.

5. An automatically or manually releasable syringe driving means for an injection machine comprising in combination: a frame; a guide support block mounted thereon and upper and lower guide members on said guide support block; means also mounted on said frame for detachably supporting a syringe with its axis parallel to said guide members; a rack supporting bar supported by said guide members for reciprocation on a line parallel to the axis of said syringe; a rack mounted at one of its ends pivotally and adjustably parallel to said line to said rack supporting near an end thereof; resilient means associated with said rack supporting bar and said rack urging said rack in a direction away from the toothed side thereof; a driven pinion supported on said frame in position for engagement by said rack in one pivotal position thereof; locking means movably mounted in position fixed with respect to said frame in one position holding said rack in engagement with said pinion and in another position permitting said rack to disengage said pinion in response to urging of said resilient means; adjustable means, moving in predetermined relationship with said rack supporting bar as same moves in response to rotation of said pinion, contacting at a predeterminable time said locking means when same is in said one position and moving it to its other position and thereby permitting said rack to disengage said pinion; a syringe engaging plate on said rack supporting bar for engaging and moving the plunger of said syringe; wherein said plunger will be moved as said rack supporting bar moves in response to rotation of said pinion until said screw strikes said locking bar and permits said rack and said pinion to disengage in response to said resilient means and stop the movement of said syringe plunger.

6. An automatically or manually releasable syringe driving means for an injection machine comprising in combination: a frame; a rack supporting bar reciprocably mounted thereon; means also mounted on said frame for detachably supporting a syringe with its axis parallel to the direction of reciprocation of said rack supporting bar; a rack mounted at one of its ends, pivotally and adjustably parallel to said syringe axis, to said rack supporting bar; resilient means associated with said rack supporting bar and said rack urging said rack in a direction away from the toothed side thereof; a driven pinion supported on said frame in position for engagement by said rack in one pivotal position thereof; locking means, movably mounted in position fixed with respect to said frame, in one position holding said rack in engagement with said pinion and in another position permitting said rack to disengage said pinion in response to urging of said resilient means; adjustable means, moving in predetermined relationship with said rack supporting bar as same moves in response to rotation of said pinion, contacting at a predeterminable time said locking means when same is in said one position and moving it to its other position and thereby permitting said rack to disengage said pinion; a syring engaging plate on said rack supporting bar for engaging and moving the plunger of said syringe; wherein said plunger will be moved as said rack supporting bar moves in response to rotation of said pinion until said screw strikes said locking bar and permits said rack and said pinion to disengage in response to said resilient means and stop the movement of said syringe plunger.

7. An automatically or manually releasable syringe driving means for an injection machine comprising in combination: a frame; a rack supporting bar reciprocably mounted thereon; means also mounted on said frame for detachably supporting a syringe with its axis parallel to the direction of reciprocation of said rack supporting bar; a rack pivotally mounted at one of its ends to said rack supporting bar and arranged for constant urging thereof pivotally in a direction away from the toothed side thereof; a driven pinion supported on said frame in position for engagement by said rack in one pivotal position thereof; locking means, movably mounted in position fixed with respect to said frame, in one position holding said rack in engagement with said pinion and in another position permitting said rack to disengage said pinion in response to said constant urging; adjustable means, moving in predetermined relationship with said rack supporting bar as same moves in response to rotation of said pinion, contacting at a predeterminable time said locking means when same is in said one position and moving it to its other position and thereby permitting said rack to disengage said pinion; a syringe engaging plate on said rack supporting bar for engaging and moving the plunger of said syringe; wherein said plunger will be moved as said rack supporting bar moves in response to the rotation of said pinion until said adjustable means strikes said locking bar and permits said rack and said pinion to become disengaged in response to said resilient means and stop the movement of said syringe plunger.

8. In a syringe driving means, including an automatic release, for an injection machine, the combination comprising: reciprocable means slidably supported with respect to said injection machine and associated with a syringe for driving same; power driven driving means releasably engaged by said reciprocable means; pivoted locking means effecting engagement between said reciprocable means and said driving means; yieldable means, fixed with respect to said injection machine, releasably holding said locking means in such position as to effect said engagement between said reciprocable means and said driving means; tripping means, adjustably fixed with respect to said reciprocable means, for automatically engaging and pivoting said locking means; so constructed and arranged that said reciprocable means can be both automatically and manually disengaged from said driving means.

9. An automatically or manually releasable syringe driving means for an injection machine comprising in combination: a frame; a rack supporting bar reciprocably mounted thereon; means also mounted on said frame for detachably supporting a syringe with its axis parallel to the direction of reciprocation of said rack supporting bar; a rack pivotally mounted at one of its ends to said rack supporting bar and arranged for constant urging thereof pivotally in a direction away from the toothed side thereof; a driven pinion arranged for engagement with said rack in one position thereof; locking means in one position holding said rack in engagement with said pinion and in another position permitting it to separate therefrom and tripping means arranged for movement in response to movement of said rack for shifting said locking means from said one position to said other position at a predetermined time; means movable in response to movement of said rack supporting bar contacting the plunger of said syringe for moving same; whereby said plunger will be moved in response to rotation of said pinion for a predetermined period of time and then movement of said plunger will be terminated without terminating rotation of said pinion.

10. A syringe supporting and actuating device comprising in combination: a supporting frame; reciprocable means slidably supported upon said frame and associated with said syringe for operating same; a pinion rotatably supported upon said frame; a rack pivotally supported upon said reciprocable means adjacent to and operable with said pinion; locking means pivotally secured to said frame for holding said rack in engagement with said pinion; and tripping means adjustably secured to said reciprocable means for automatically pivoting said locking means thereby disengaging said rack from said pinion.

11. A syringe supporting and actuating device comprising in combination: a supporting frame; reciprocable means slidably supported with respect to said frame for operating said syringe; driving means on said frame adjacent to said reciprocable means; driven means pivotally supported upon said reciprocable means and releasably engageable by said driving means; locking means secured to said frame for effecting engagement between said driven and driving means; and tripping means adjustably secured to said reciprocable means for automatically effecting disengagement between said driven and driving means.

WILLIAM RALPH SMITH.

REFERENCES CITED

The following references are of record in the file of this patent:

UNITED STATES PATENTS

| Number | Name | Date |
|---|---|---|
| 2,221,739 | Reiter | Nov. 12, 1940 |
| 2,270,804 | Dutky et al. | Jan. 20, 1942 |

FOREIGN PATENTS

| Number | Country | Date |
|---|---|---|
| 28,796 of 1913 | Great Britain | Dec. 13, 1913 |